United States Patent [19]

Mazzetti

[11] 4,124,507
[45] Nov. 7, 1978

[54] RECIPROCATING VACUUM FILTER

[76] Inventor: Flavio J. Mazzetti, 6580 Arequa Ridge La., Colorado Springs, Colo. 80919

[21] Appl. No.: 723,980

[22] Filed: Sep. 16, 1976

[51] Int. Cl.² .............................................. B01D 29/02
[52] U.S. Cl. .................................... 210/141; 210/327; 210/328; 210/329
[58] Field of Search ............... 210/106, 107, 108, 139, 210/141, 142, 143, 327–329, 138, 331, 332, 334

[56] References Cited

U.S. PATENT DOCUMENTS

| 2,326,484 | 8/1943 | Moreton | 210/329 X |
| 3,298,524 | 1/1967 | Gaudfrin | 210/138 |
| 3,950,254 | 4/1976 | Donovan et al. | 210/332 X |

*Primary Examiner*—John Adee
*Attorney, Agent, or Firm*—Richard W. Hanes

[57] ABSTRACT

A filtering apparatus with hollow filters that are alternately placed under reduced pressure and positive pressure. The filters are reciprocally rotated through a cycle along a 180° arcuate path from immersion in the unfiltered liquid to a discharge station and back again. While immersed and under reduced pressure, each filter passes liquid and captures cake against its surface. The filter is kept under reduced pressure and rotated to a discharge station. The reduced pressure during this portion of the cycle holds the cake against the filter and dries it. At the discharge station, the filters are placed under positive pressure to dislodge the cake and kept under positive pressure as they are rotated back toward the unfiltered liquid. The discharge station has movable scrapers that contact the filters as they are being rotated back to the unfiltered liquid to assist in dislodging the cake. The filters are arranged in two opposing sets capable of meshing with each other in the liquid and operable either in phase or approximately 180° out of phase. The invention includes an adjustable control means that controls the operation of all the moving parts of the apparatus as well as the timing and duration of the pressures applied to the filters. The control means can vary the overall time period of a filter's cycle as well as the length of time the filter spends in each portion of its cycle.

5 Claims, 6 Drawing Figures

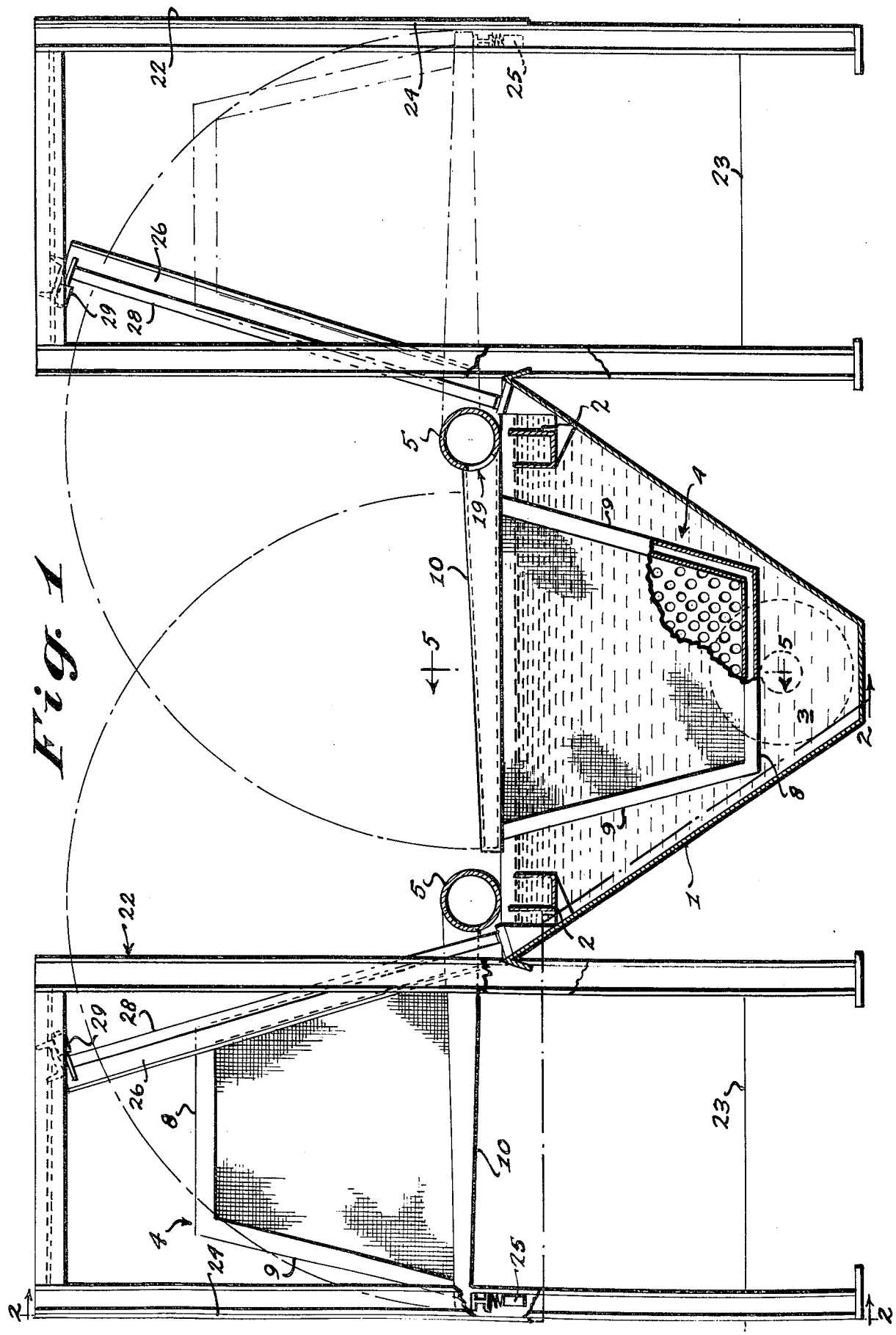

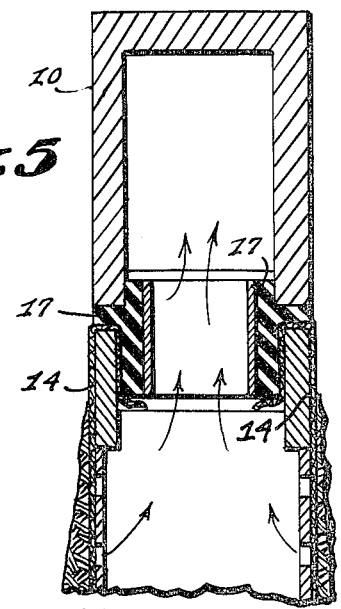
Fig. 5
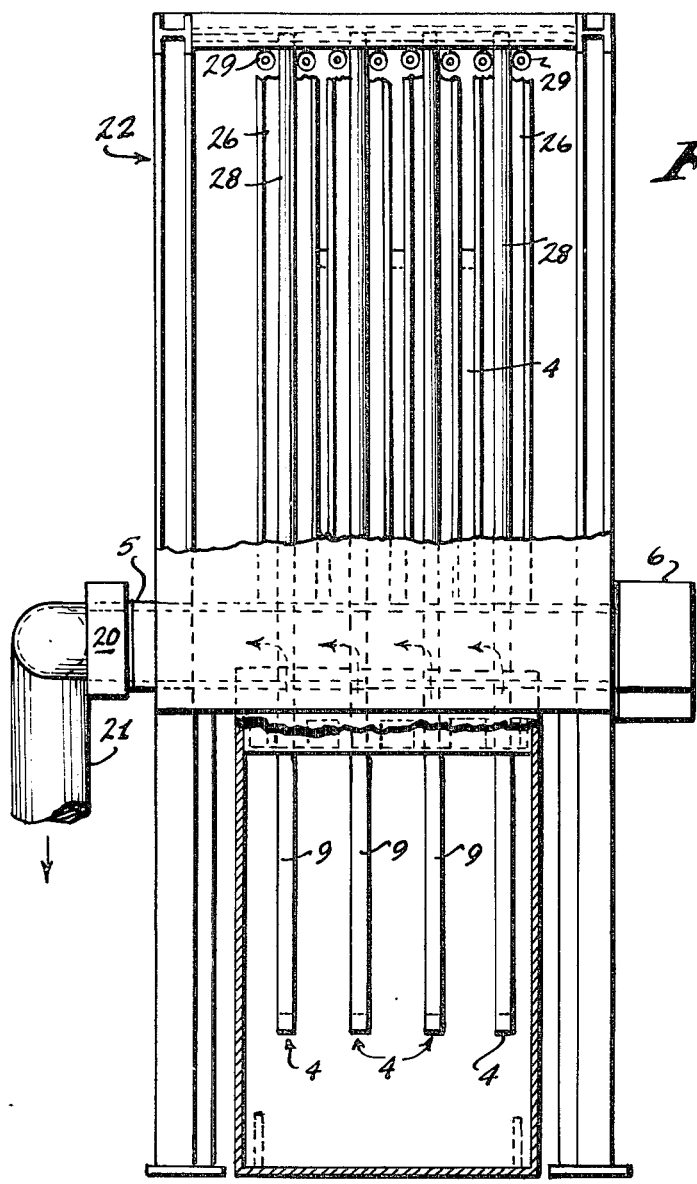
Fig. 2
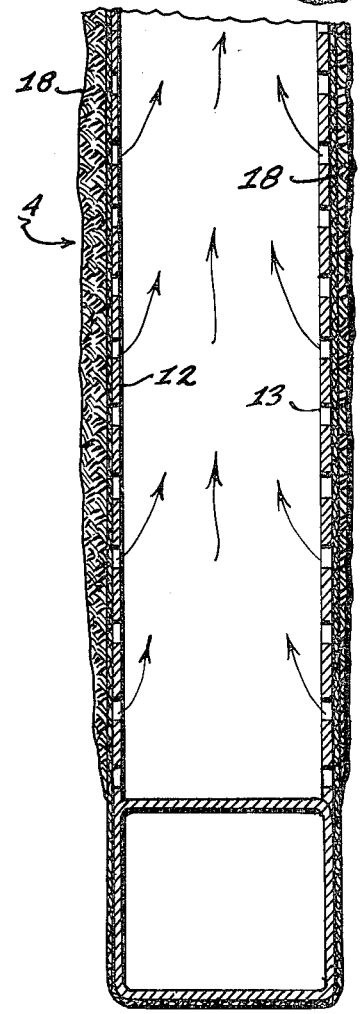
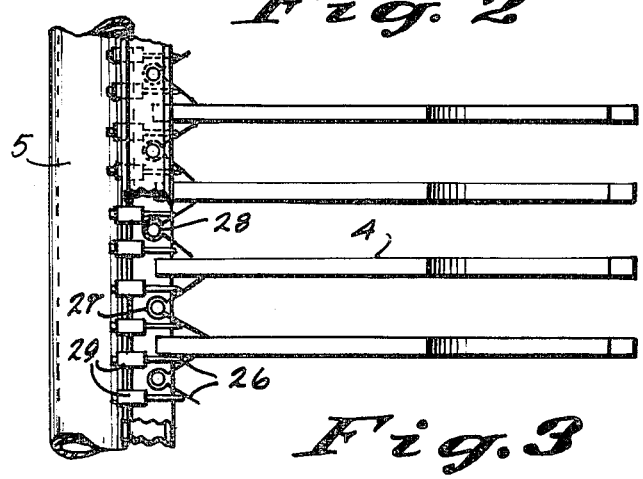
Fig. 3

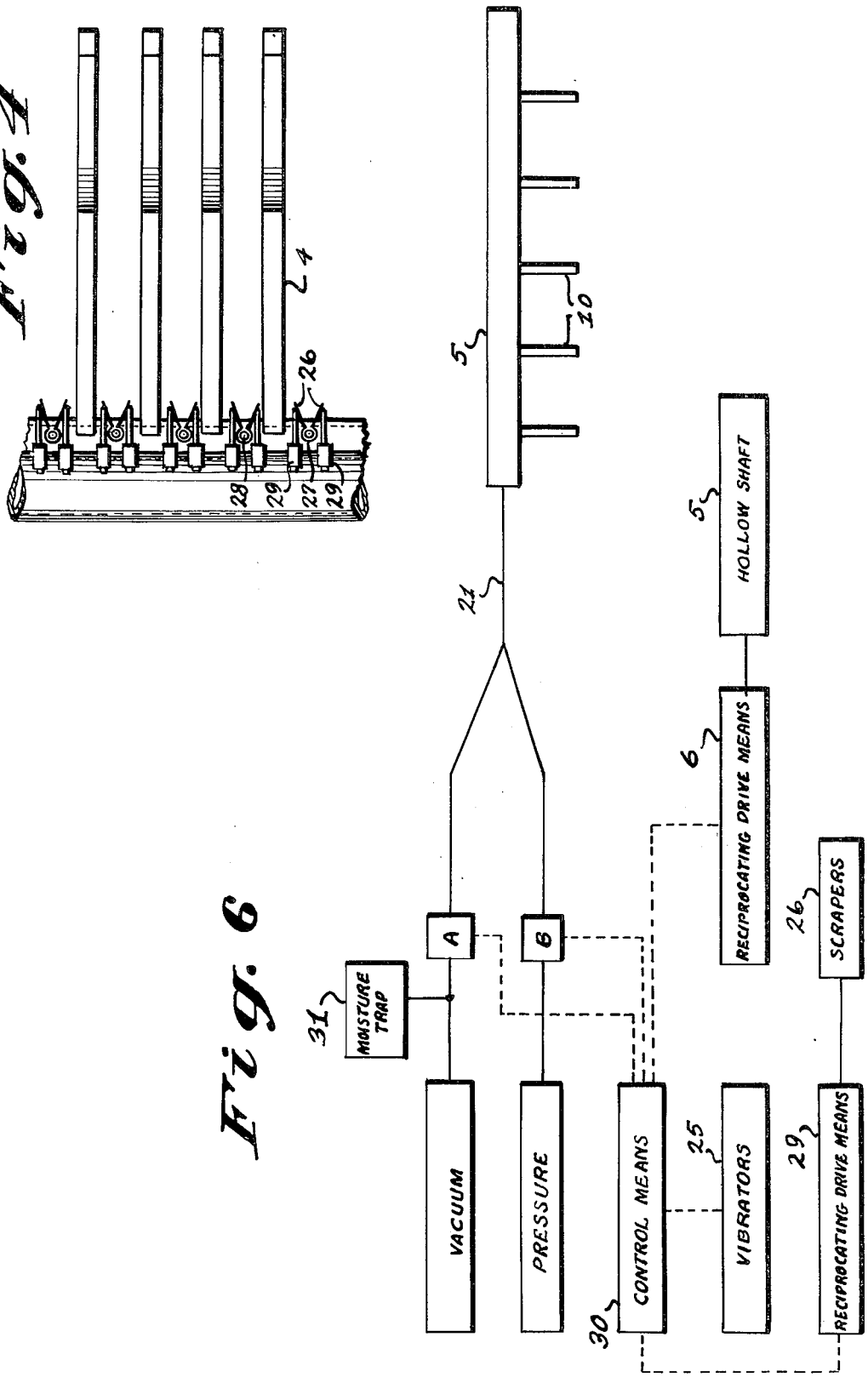

RECIPROCATING VACUUM FILTER

BACKGROUND OF THE INVENTION AND PRIOR ART

Two of the most common filtering techniques are the drum type and the disc type. Both techniques operate on rotating cycles in which the bottom half of the drum or disc is immersed in a trough holding fluid pulp while the top half is out of the pulp. The bottom half is held under vacuum as is most of the top half. A small section of the top half near the end of the cycle is under positive pressure to blow the cake off the filter. These filters usually have a scraper near the end of the cycle to help remove the cake. In these rotary filters, approximately 50% of the cycle for any given portion of the filter is spent rotating it immersed in the pulp drawing fluids through the filter and collecting cake against it. The rest of the cycle is spent out of the pulp and is usually divided so that 40% of the entire cycle is spent continuing to draw liquid from the cake held against the filter and the last 10% is spent blowing and scraping the cake off the filter.

The rotary nature of these filters allows very little if any variation in the percentage of time in a cycle allotted to perform each function. If the rotational speed is increased, the overall time of a cycle is reduced but the percentage of the cycle spent performing each function remains the same. The half of the cycle in which the filter is immersed is usually not a requirement to form the cake on the filter, but is more of an obligatory result of the rotary design of the filter. The cake can often be formed in less than the allotted 50%. In such cases, if the percentage of the cycle spent out of the pulp could be increased, more fluid would be drawn from the cake, making it drier. It is possible to decrease the relative time of the rotating filter spent in the pulp by immersing much less than half of the filter's area. With a disc filter that rotates about an axis parallel to the surface of the pulp, this is very inefficient because the surface area against which the cake collects is greatly reduced. With drum filters, this surface area would also be greatly reduced and the overall time to filter a given amount of pulp would be increased.

Another class of filters is reciprocating ones that are moved into and out of the pulp. Such a filter is broadly disclosed in U.S. Pat. No. 3,298,524 to Gaudfrin, issued in Class 210, Subclass 138. Gaudfrin discloses a reciprocating filter that is moved about a tank and swung through a path of 90° or 180°. In his preferred embodiment, Gaudfrin has a round tank divided into three chambers. His filters are moved about the tank and immersed in the first chamber full of concentrated pulp or crushed beets. Fluid is drawn through the filter and cake collects on it. The filter is then lifted out of the chamber, moved about the tank, and immersed in chamber two. This chamber contains water which is drawn through the beet cake on the filter to produce a diluted liquor. The filter is soon raised and advanced to a third chamber where air is first drawn through the filter to dry the cake and then blown through it to dislodge the cake. Gaudfrin provides a mechanism to jolt the filters over the third chamber to assist in dislodging the cake. He also has a timer to synchronize the movement of the filters.

Devices like Gaudfrin's are more concerned with producing a diluted liquor than in the efficient separation of the liquid from its cake. Consequently, their timers are only used to coordinate the movement of all the filters relative to each other so that they do not jam. Devices like Gaudfrin's do not contemplate using the timer to alter the time spent in each portion of a filter's cycle. Speeding up a timer like Gaudfrin's would only alter the length of each filter's overall cycle, not the relative time spent performing each function in the cycle. These relative times are predetermined by Gaudfrin's structure.

OBJECTS OF THE INVENTION

It is an object of this invention to provide a reciprocating filter with an adjustable cycle. This adjustable feature enables the operator to control the period of a filter's cycle and the time spent by the filter in any portion of the cycle in accordance to the particularities of the liquid being filtered. If cake forms quickly on the filter when it is immersed in the liquid, then the cycle is set so less of the filter's time is spent immersed collecting cake and more of it is spent out of the liquid drying the cake.

Another object is to provide a filtering apparatus with movable scrapers to assist in dislodging cake from the filters.

Another object is to provide a filtering apparatus in which sets of reciprocating filters operate from opposite sides of the trough to decrease the overall filtering time. These sets are capable of meshing with each other in the liquid and can be operated in phase or 180° out of phase.

Another object is to provide a filtering apparatus with vibrators to assist in dislodging the cake from the filters.

Other and still further objects of the invention will be apparent upon a reading of the following specification taken in connection with the drawings in which:

FIG. 1 is a cross-sectional view of the invention showing the filters operating from opposite sides of the trough and 180° out of phase.

FIG. 2 is a side view taken along line 2—2 of FIG. 1 with portions of the structure broken away and shown in cross section, and showing one set of reciprocating filters in the trough and the other set at its discharge station with the movable scrapers against the sides of the filters.

FIG. 3 is a top view of the movable, spring mounted scrapers in their operating position against the filters.

FIG. 4 is a top view of the scrapers being held away from the filters by their reciprocating control means.

FIG. 5 is a cross-sectional view of a filter taken along line 5—5 of FIG. 1.

FIG. 6 is a schematic of the control system of the filtering apparatus.

DETAILED DESCRIPTION OF THE INVENTION

To hold the liquid during the filtering process, the apparatus of the present invention utilizes an upwardly open trough 1 which receives the liquid or magma through launders 2 longitudinally disposed along the sides of the trough. An agitator 3 located in the bottom of the trough keeps the liquid well mixed and the undissolved solids in suspension. Two sets of filters 4 are each cantilevered from respective spaced apart parallel hollow shafts 5 which are separately disposed along the upper edge of the longitudinal side walls of the trough 1. The shafts 5 are rotatably mounted and connected to separate drive motors 6 so that the shafts may be selectively rotated 180°. The drive motors can be rotational, however a reciprocating drive means wherein the linear motion is translated into rotational movement of the shafts 5 is preferred.

The filter sets comprise a plurality of filter vanes 4 which are individually carried by tubular mounted arms 10 attached in spaced apart relation to one of the hollow shafts 5. The filter vanes 4 of one filter set are disposed and positioned in an alternately interleaved arrangement with the filter elements 4 of the other filter set. Inasmuch as the two filter sets are separately driven, the sets can be operated in phase with each other or out of phase. The time which each filter set spends in the trough can be and usually is disproportionate to the time spent out of the trough in the drying position.

Each of filter vanes 4 is constructed on a trapazoidal shaped frame having the non-parallel sides 9 connected to one of the cantilever mounting arms 10 and having the base 8 substantially parallel to the arm 10. To provide rigidity to the filter cloth 14, spaced apart parallel perforated plates 12 and 13 are mounted on the frame forming therebetween an interior cavity within the filter vane 4, which cavity is in communication with the interior of its mounting arm 10. The filter cloth or mesh is overlaid on the perforated sides and secured in place by any convenient means. Mounting rails 14 are shown in FIG. 5 cooperating with a seal member 17 to secure the filter cloth 14 in position.

In operation, when liquid is drawn into the filter vane 4 through the filter cloth 14, particles, or cake 18, are formed on the outside of the filter cloth while the filter liquid is drawn off through the interior of the vane and through the mounting arm 10 and hollow shaft 5 to a disposal conduit 21.

As seen in FIGS. 1 and 2, each mounting arm 10 communicates through a port 19 with the interior or hollow shaft 5 which, in turn, communicates through rotary joint 20 with stationary conduit 21. Conduit 21 can be selectively connected either to a vacuum source or to a source under pressure as schematically shown in FIG. 6.

Referring to FIG. 1-2, each set of filters is moved by the drive motor 6 and shaft 5 through an arc of approximately 180° from a position immersed in the trough 1 to a discharge station within the frame 22. The frame 22 contains a discharge receiver 23, which can be a stationary container or a moving conveyor, and a splash cover 24. In one of its extreme positions, the filtering vanes 4 rests against a pneumatic vibrator 25 mounted on the frame 22.

To assist in cleaning dried cake from the filter screens, there are provided a plurality of retractable scraping blades 26 which are carried by rods 28 mounted on the frame 22. The scrapers may take several different forms, however, they are preferably spring biased against the surfaces of each filter vane, as shown in FIG. 3. To retract the scraper blades, a plurality of pneumatically operated pistons 29 are positioned to bring a retracting force to bear against the blades and the normal spring forces holding them in place.

FIG. 6 is a schematic diagram of the control system for the filtering apparatus. The control means 30 can be any number of known devices operating valves A and B to selectively place the conduit 21 under vacuum or positive air pressure. The vacuum line contains a moisture trap 31. The control means 30 also operates the drive motor 6 to rotate the hollow shafts 5 and the reciprocating pistons 29 for the scrapers 26. The control means 30 is adjustable and can vary the overall period of time in which the filtering vanes 4 are immersed in the trough 1, withdrawn to the discharge station in frame 22, and immersed back into the trough 1. The control means 30 can also vary the time spent by the filtering vanes 4 in any portion of the cycle. For example, the filters 4 can be controlled to spend 50% of their cycle immersed in the trough, or only 20%. In this fashion, the filter's cycle can be adapted to the particularities of the pulp being filtered. If a certain pulp quickly forms a cake on the immersed filter, then less of the filter's cycle is allotted to immersion and more time is given to drying the cake. The control means 30 is further adjustable to vary the portions of the cycle in which the filter is under vacuum or positive pressure as well as the duration and placement of these portions in the cycle. In a similar manner, the operation of the vibrators 25 and scrapers 26 can be selectively controlled.

The control means 30 operates both sets of filters. The controlled components for each set are identical and for purposes of illustration, the control means 30 is shown in FIG. 6 operating only one set of components. The other set can be operated by the control means 30 with the same or different cycle and in or out of phase. The phase shift can range from 0° to 360°. In the preferred embodiment, the two sets have the same cycle, but are 180° out of phase.

In operation, the liquid to be filtered is fed through launders 2 into trough 1 where agitator 3 keeps it well mixed. The control means 30 activates the drive motor 6 for one set of filter vanes 4 to rotate the hollow shaft 5 and lower the filters of one set into the liquid to begin a cycle. Valve A to the vacuum source is opened to produce a flow from the trough 1 through the filter 11 into the hollow arm 10. The flow continues through port 19 into the hollow shaft 5 and through the rotary joint 20 into conduit 21 and finally through the moisture trap 31. Cake will build up on each of the filters 4 during this portion of the cycle. After a programmed time, the control means 30 will activate the drive motor 6 to rotate the hollow shaft 5 to move the filtering vanes 4 180° into the frame 22 where they will come to rest on vibrators 25. The vibrators 25 are not activated at this time. The vacuum is continuously applied during this portion of the cycle to extract fluid from the cake to dry it.

After a programmed time, the control means 30 closes valve A and opens valve B to subject the filters to positive air pressure. The positive pressure bulges the filter cloth 14 and dislodes the cake. Simultaneously, the vibrators 25 are actuated and the reciprocating drive means 29 are retracted to position the scrapers 26 against the sides of the filters 4. Following a programmed time, the control means 30 activates the drive motor 6 to move the filtering vanes 4 back toward the trough 1. The valve B and scrapers 26 remain operating until the filtering vanes 4 are moved past the scrapers. Valve B is then closed and the drive means 29 for the scrapers 26 are extended, thus retracting the blades. The drive motor 6 continues to rotate the filtering means 4 back into the liquid to complete a cycle. In the preferred embodiment, the two sets of filters are operated approximately 180° out of phase.

The cycle described above is a preferred manner of operating the filtering apparatus. The control means 30 is adjustable so that the operation of each of the components of the apparatus can be varied. In this manner, the filtering appartus can be adopted to the specific properties of the liquid to be filtered.

I claim:

1. In a filtering apparatus comprising an upwardly open trough adapted to contain a liquid to be filtered,
first and second filtering means each comprising a plurality of filter elements interleaved with each other when positioned in the trough,
first and second drive means operably connected to the respective first and second filtering means;
a pair of spaced apart parallel drive shafts disposed along opposite sides of said trough, each of said shafts carrying the filter means of the respective first and second sets thereof and means interconnecting each of said drive shafts with the respective drive means whereby operation of said drive means rotates said shafts about their longitudinal axis, and moves said hollow filtering means about an axis through a substantially planar path from said trough to a discharge station and back again;
frame means including movable scraper means and support means to position said scraper means adjacent the substantially planar path of said hollow filtering means, and said frame means further including moving means to move said scraper means into and out of contact with said path, and wherein said moving means moves said scraper means into and out of contact with said planar path in an area of said path between the trough and the discharge station; and
adjustable control means to control said moving means whereby said scraper means is moved into contact with said path after the hollow filtering means passes said area on its way to the discharge station, held there until said hollow filtering means passes said area on its way back to said trough, and then moved away from said path.

2. The filtering apparatus of claim 1 wherein:
said reciprocal drive means moves said at least one hollow filtering means through an arcuate planar path of substantially 180°.

3. The filtering apparatus of claim 1 including:
a plurality of hollow filtering means rotated by said drive means about said axis, each of said plurality of hollow filtering means includes at least one side extending substantially perpendicular to said axis, at least one of said hollow filtering means includes a second side extending substantially perpendicular to said axis, each of said sides being spaced from each other along said axis and being reciprocally moved by said drive means along a substantially planar path,
said scraper means includes a plurality of movable scraper elements and said support means of said frame means includes a plurality of supporting elements to position at least one of said scraper elements adjacent to each of said sides, and
said moving means moves each of said scraper elements into and out of contact with the planar path of its respective side.

4. The filtering apparatus of claim 3 wherein:
at least one said supporting elements is a shaft positioned between two of said sides and extending substantially perpendicular to the axis of rotation and said hollow filtering means, and
at least one of said moving means for said scraper elements includes a C-shaped spring member mounted loosely about said shaft, two of said scraper elements being attached to the ends of said C-shaped member and extending substantially radially outwardly into the paths of said two sides, said moving means further includes reciprocal means to move said scraper elements on said C toward each other and away from their respective sides so that said C-shaped spring member is tightened about said shaft and tensioned to move said scraper elements back into the path of their respective side.

5. The filtering apparatus of claim 4 including:
adjustable control means to selectively control the operation of said first and second drive means whereby said first and second drive means can be selectively operated in phase or out of phase.

* * * * *